(12) United States Patent
Assuncao et al.

(10) Patent No.: US 8,930,541 B2
(45) Date of Patent: Jan. 6, 2015

(54) SYSTEM, METHOD AND PROGRAM PRODUCT FOR COST-AWARE SELECTION OF TEMPLATES FOR PROVISIONING SHARED RESOURCES

(75) Inventors: Marcos Dias De Assuncao, Sao Paulo (BR); Marco Aurelio Stelmar Netto, Sao Paulo (BR); Brian L. Peterson, Ridgefield, CT (US); Lakshminarayanan Renganarayana, Elmsford, NY (US); John J. Rofrano, Mahopac, NY (US); Christopher C. Young, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 13/304,571

(22) Filed: Nov. 25, 2011

(65) Prior Publication Data

US 2013/0138812 A1 May 30, 2013

(51) Int. Cl.
*G06F 15/173* (2006.01)
(52) U.S. Cl.
USPC ........... 709/226; 709/224; 709/212; 709/213; 709/223
(58) Field of Classification Search
USPC .................. 709/226, 224, 212, 213, 223
See application file for complete search history.

(56) References Cited

U.S. PATENT DOCUMENTS

| | | | |
|---|---|---|---|
| 7,779,389 B2 | 8/2010 | Markov et al. | |
| 2007/0271203 A1 | 11/2007 | Delvat | |
| 2008/0126406 A1* | 5/2008 | Endabetla et al. | 707/103 R |
| 2008/0294777 A1 | 11/2008 | Karve et al. | |
| 2009/0171705 A1* | 7/2009 | Bobak et al. | 705/7 |
| 2009/0228589 A1 | 9/2009 | Korupolu | |
| 2011/0004676 A1 | 1/2011 | Kawato | |
| 2011/0022694 A1 | 1/2011 | Dalal et al. | |
| 2011/0179041 A1 | 7/2011 | Souto et al. | |
| 2011/0202640 A1 | 8/2011 | Pillutla | |
| 2012/0011515 A1* | 1/2012 | Jolfaei et al. | 718/103 |

OTHER PUBLICATIONS

A. V. Dastjerdi, et al., "An effective architecture for automated appliance management system applying ontology-based cloud discovery,", "ACM CCGrid", May 2010, pp. 104-112, Publisher: IEEE, Published in: Melbourne, Australia.
M. J. Litzkow, et al., "Condor—a hunter of idle workstations", Jun. 1998, pp. 104-111, Publisher: 8th International Conference of Distributed Computing Systems,, Published in: San Jose, US.
M. Mao,, "Cloud auto-scaling with deadline and budget constraints", "ACM", 2010, pp. 41-48, Publisher: IEEE.
Siddiqui, et al., "Grid Capacity Planning with Negotiation-Based Advance Reservation for Optimized QoS", "ACM Supercomputing", 2006, p. 103 Publisher: IEEE.
PCT ISR Feb. 4, 2013.

\* cited by examiner

*Primary Examiner* — Lan-Dai T Truong
(74) *Attorney, Agent, or Firm* — Law Office of Charles W. Peterson, Jr.; Louis J. Percello, Esq.

(57) ABSTRACT

A template generator organizing templates in a cost-aware clustering, a method of allocating resources using cost-aware clustering and computer program products therefor. A resource provisioning unit generates, selects and maintains a selected number of resource templates. Each template specifies an allocable resource capacity configuration. Each requesting client device has resources allocated determined by one of the selected resource templates. A resource provisioning unit includes a configuration store with costs of allocable resources and associated attributes, a server request store with previously received requests, and an input parameter store with template list options. A template generator determines an optimum list of templates to satisfy previously received requests. A template store stores generated template lists.

24 Claims, 8 Drawing Sheets

SYSTEM, METHOD AND PROGRAM PRODUCT FOR COST-AWARE SELECTION OF TEMPLATES FOR PROVISIONING SHARED RESOURCES

BACKGROUND OF THE INVENTION

1. Field of the Invention

The present invention is related to allocating shared resources and more particularly to selecting an optimal set of templates for satisfying resource requests with minimal over and under provisioning.

2. Background Description

Acquiring and managing Information Technology (IT) is a major budgetary concern for any modern organization. Moreover, local IT hardware is seldom used at full capacity. So to reduce IT infrastructure costs and waste, instead of acquiring physical hardware, organizations are increasingly consolidating workload on virtual machines (VMs) hosted on fewer servers. A remote server computer provides each VM as a virtual server with virtual resources, e.g., processing power, memory and disk space. Typically, each VM configuration is selected from a number of virtual resource templates (VRTs or templates). Each VRT defines predetermined virtual resource capabilities, assignable to define a VM. So, the server computer(s) allocates capacity (e.g. disk space, processing resources and memory) to each VM by assigning a VRT that is most closely configured (software stack and licenses) for the VM's intended purpose and expected needs.

In managing these VMs it has been difficult to determine their optimal capacity and an optimal configuration, i.e., selecting the optimal VRT. Typically, a service provider selects a VRT and allocates corresponding physical resources for each VM, primarily, based on provider system optimization, workload predictions and resource usage history collected from continuously monitoring VM resource usage. Even good prediction results, however, can impair user experience due to over or under allocation. Over-allocation wastes energy and resources, capacity that would otherwise be available to other users or for supporting additional VMs. Because under-allocation allocates inadequate resources to one or more VMs, it impacts Quality-of-Service (QoS) on those VMs, e.g., halting video or garbled audio.

User requirements are highly variable which may force providers to vary the definition and number of templates they offer. While resource providers can increase the number of offered VRTs to meet all requests, increasing the number can cause resource overprovisioning and template sprawling. Resource overprovisioning, like over-allocation, consumes more resources and energy than is necessary for the provided capacity; that excess resource and energy could otherwise be made available to other users or for additional VMs. Template sprawling, also known as image sprawl, occurs when one template or image that fits one user's needs is tweaked to suit another, adding another template to the offered VRTs. Eventually, the number of templates expands to an unmanageable number.

Several approaches to matching application server requests to available resources have been tried. The typical cloud computing approach has been to select a VM template that most closely matches the requirements of the target user application ignoring the cost of the selection. Some other prior approaches specify and store VM templates and network templates, primarily, to accelerate installing VMs, associated networks and required software. Still other approaches have created profiles of running VMs and selecting target migration servers. Alternately, rather than focus on selecting virtual resource templates, other techniques focus on scaling applications to the templates, i.e., fitting the application to the VM rather than vice versa. Finally, a state of the art approach matches user provided Open Virtualization Format (OVF) instances to appropriate cloud offerings.

Thus, there is a need for allocating adequate IT resources for a minimum cost and without wasting resources, while also maintaining server QoS, and more particularly, there is a need for selecting a set of VM templates for provisioning VMs in cloud infrastructure, templates that efficiently satisfy the majority of user requirements for minimal cost.

SUMMARY OF THE INVENTION

A feature of the invention is minimized over-provisioning of cloud resources;

Another feature of the invention is reduced template sprawling/image sprawl in a cloud environment;

Yet another feature of the invention is a pool of VM templates/images, selected for cost-aware clustering to better match client needs, thereby reducing client costs and wasted resources.

The present invention relates to a template generator organizing templates in a cost-aware clustering, a method of allocating resources using cost-aware clustering and computer program products therefor. A resource provisioning unit generates, selects and maintains a selected number of resource templates. Each template specifies an allocable resource capacity configuration. Each requesting client device has resources allocated determined by one of the selected resource templates. A resource provisioning unit includes a configuration store with costs of allocable resources and associated attributes, a server request store with previously received requests, and an input parameter store with template list options. A template generator determines an optimum list of templates to satisfy previously received requests. A template store stores generated template lists. The resulting template lists are based on the collective cost of resources for each. Resources that may have widely divergent and varying costs individually, e.g., high cost difference among processing power, memory, and disk space.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
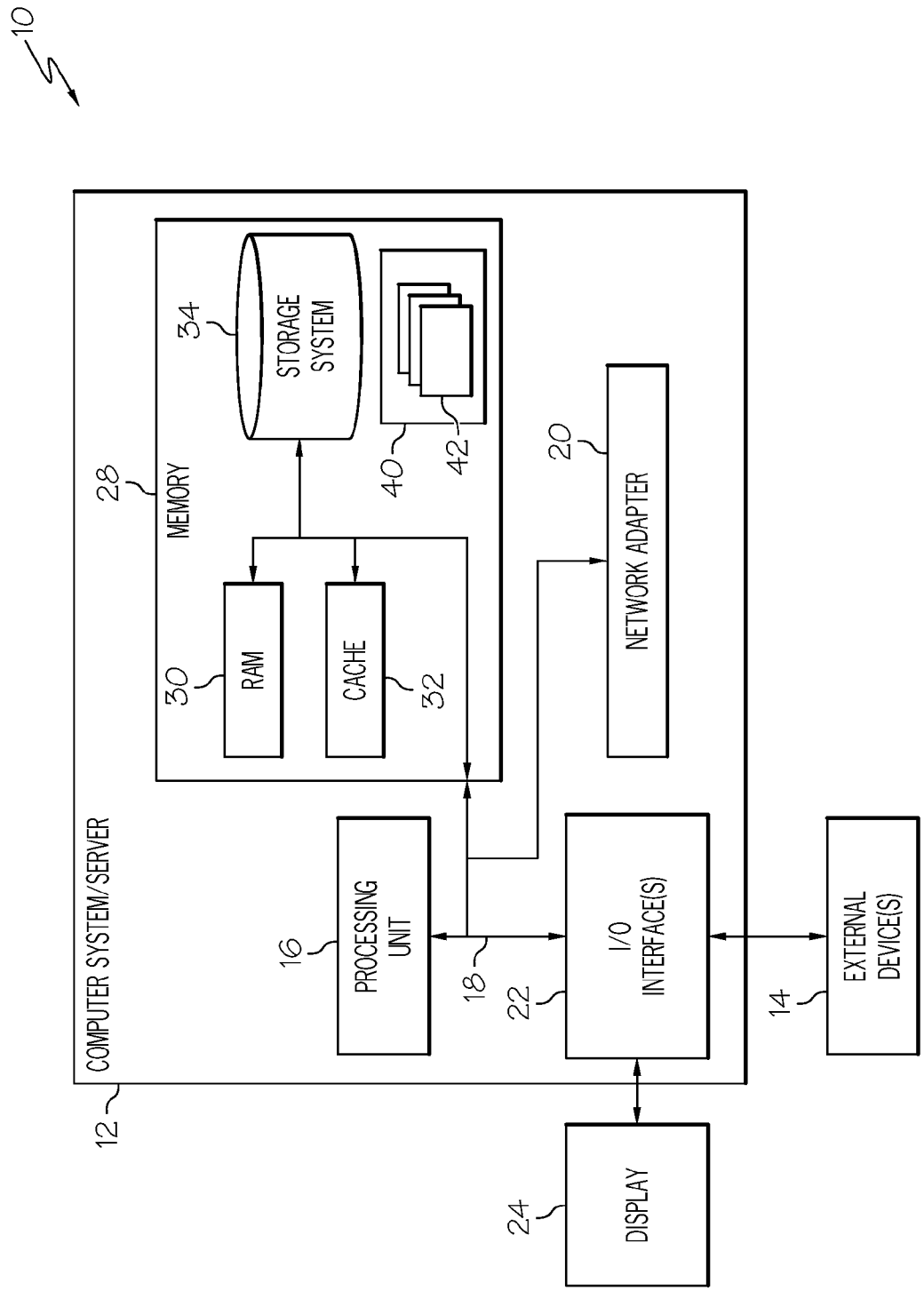
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices including computer usable medium.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
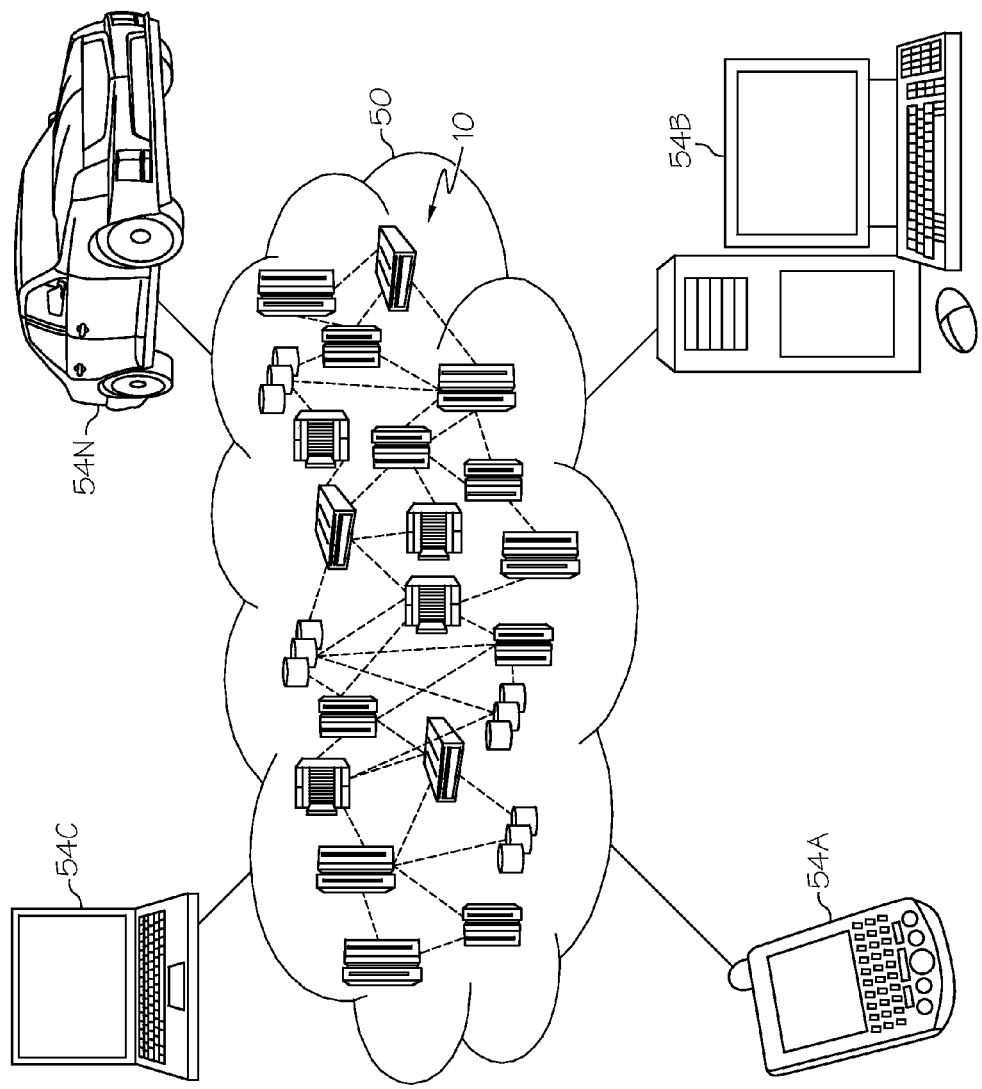
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
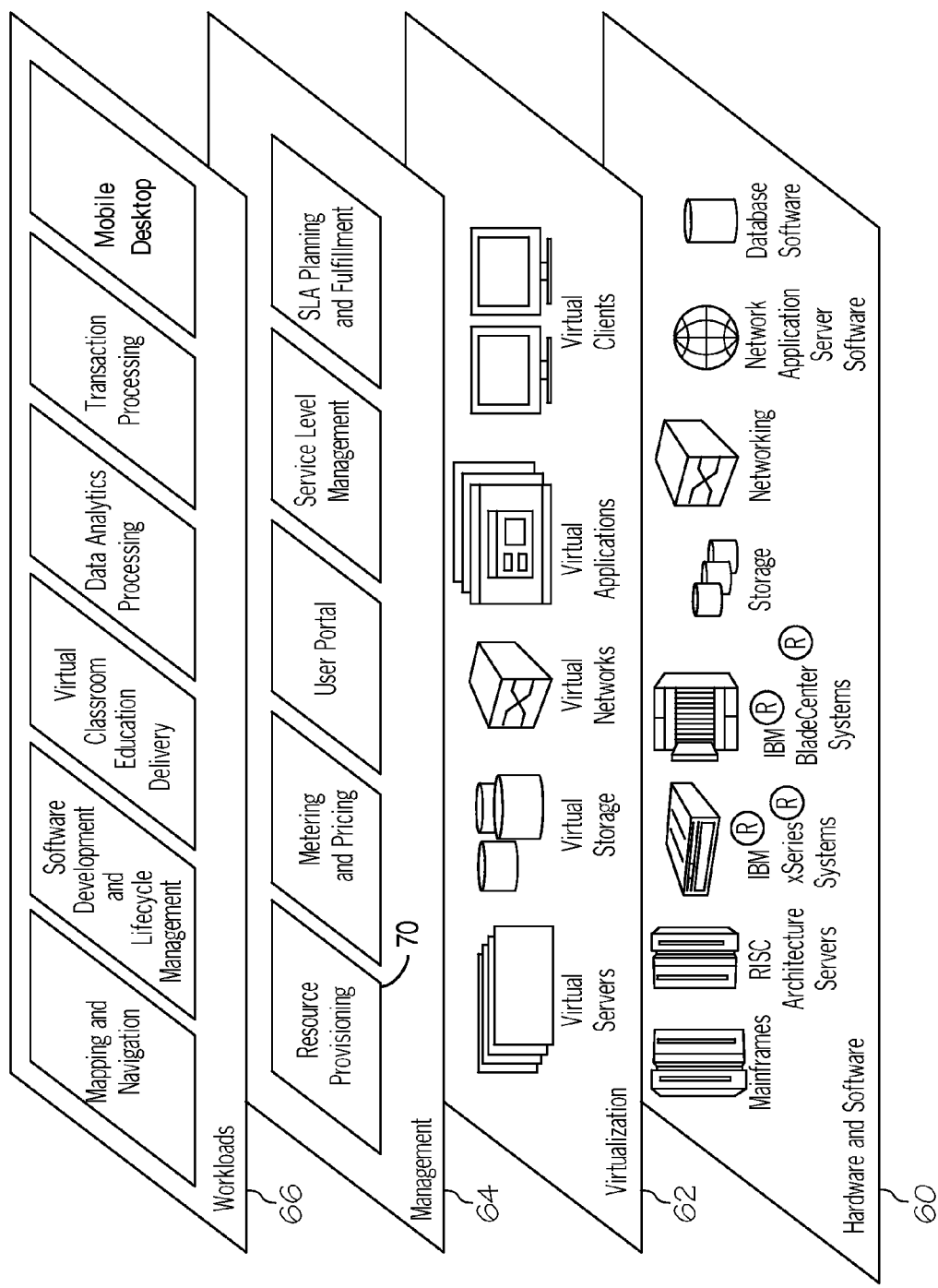
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning 70 provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktop.

Figure 4:
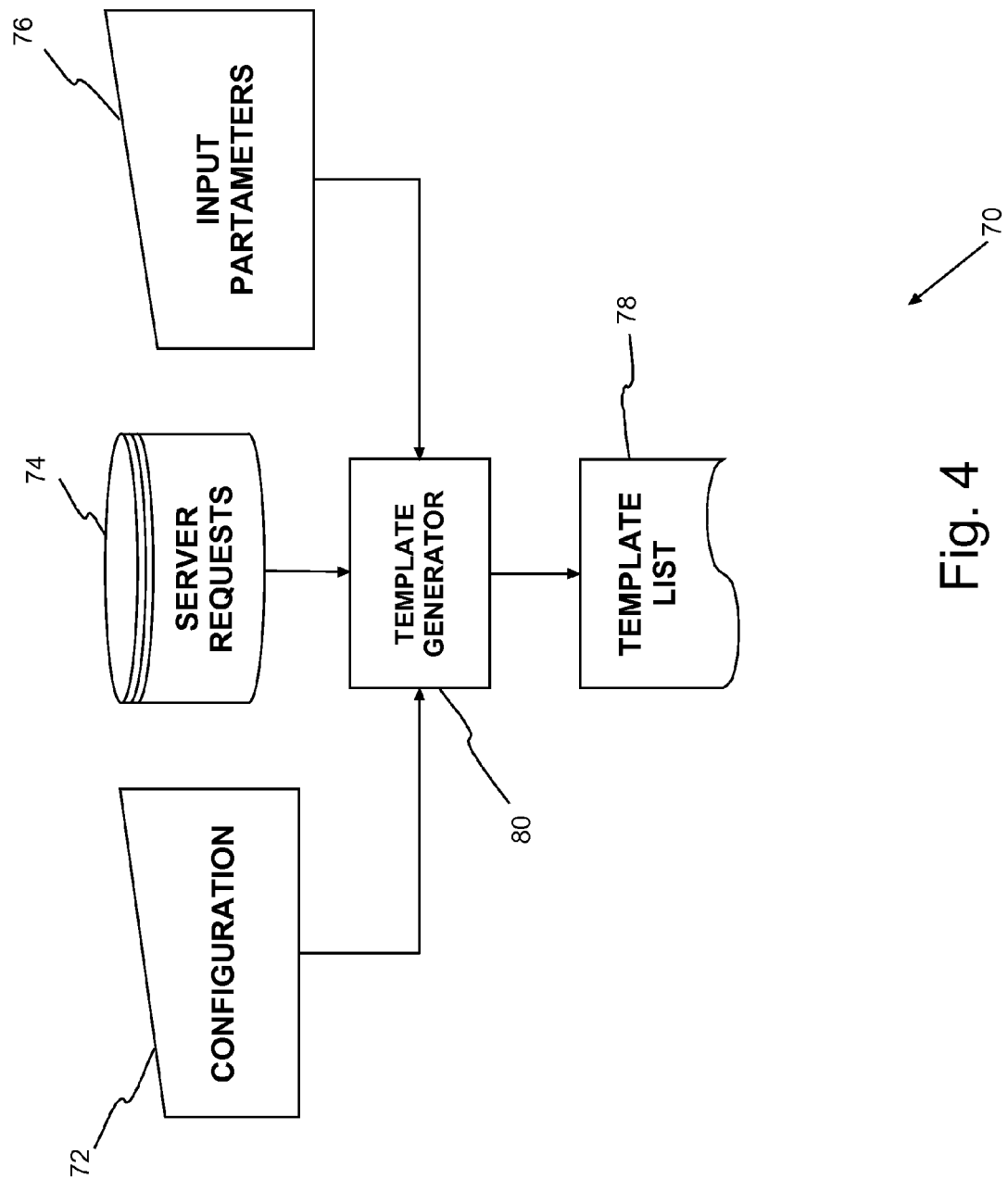
FIG. 4 shows an example of a resource provisioning unit for cost-aware clustering to match templates to requests for resources according to a preferred embodiment of the present invention.

FIG. 4 shows an example of a resource provisioning unit 70 for cost-aware clustering to match templates to requests for resources according to a preferred embodiment of the present invention. In particular, the preferred cost-aware clustering technique considers the collective cost of resources that, individually, may have widely divergent and varying costs, e.g., high cost difference among processing power, memory, and disk space. Essentially, after determining a minimum cost match for each server request, the list of templates is refined according to the number of satisfied requests of a given template. The present invention has application to cloud computing, allowing providers to analyze the trade-offs between the number of VM templates, the level of server requirements satisfied, and the potentially widely divergent cost of satisfying the requirements.

A preferred resource provisioning unit 70 includes configuration storage 72, server requests storage 74, Input Parameter storage 76, Template storage 78 and template generator 80. Configuration storage 72, server requests storage 74, Input Parameter storage 76 and Template storage 78 may be individual storage units or stored in a single storage, e.g., in storage 34 of FIG. 1. The preferred template generator 80 implements a preferred cost-aware clustering technique that selects and determines the number of templates needed to meet the computing requirements for a set of server requests.

The configuration storage 72 contains resource costs and associated attributes. For example, an entry for a server template with a virtual 2.1 GHz central processing unit (CPU), 1 terabyte (1 TB) of disk storage and 2 GB of RAM, may specify a cost of $0.08 per hour. Preferably, the server requests storage 74 includes a server request database with previously received server requests defined by resource type, such as CPU (or CPU equivalent, e.g., dual core 64 bit i86), memory and disk space. Input Parameter storage 76 stores an indication of whether a "Best templates" option is selected so that the template generator 80 lists all templates; or stores the values of k, and a template percentage, that are used when and if, a top k templates option is selected. The preferred template generator 80 generates an initial set of templates from the number of available combinations. Then, implementing a preferred cost-aware clustering technique, the template generator 80 determines the number of templates needed to meet the server request requirements in a minimum cost match. After calculating the minimum cost match for each server request, the template generator 80 refines the list of templates according to the number of satisfied requests of a given template and stores refined lists in template storage 78.

Preferably, server requests are stored in a request database in server requests storage 74, and each request is defined by resource type, e.g., CPU, memory and disk. The preferred template generator 80 produces a complete list of templates to meet all server request demands, e.g., based on a "Best templates" option specified in the Input Parameter storage 76. Alternately, the preferred template generator 80 generates the top k templates that meet the requirements of most server requests, e.g., using a "Top k templates" option, also specified in the Input Parameter storage 76.

The template generator 80 calculates a minimum cost match for each server requirement from a complete list of templates to meet all request server demands. From these minimum cost matches, the template generator 80 selects the k ($k_1, k_2, \ldots, k_n$) for the top k list that meets the requirements of most server requests, e.g., by percentage satisfaction or lowest overall cost. The resulting set of most frequently requested templates are a subset of templates and indicate the total cost and are selected as the final, smaller, set of templates.

Figure 5:
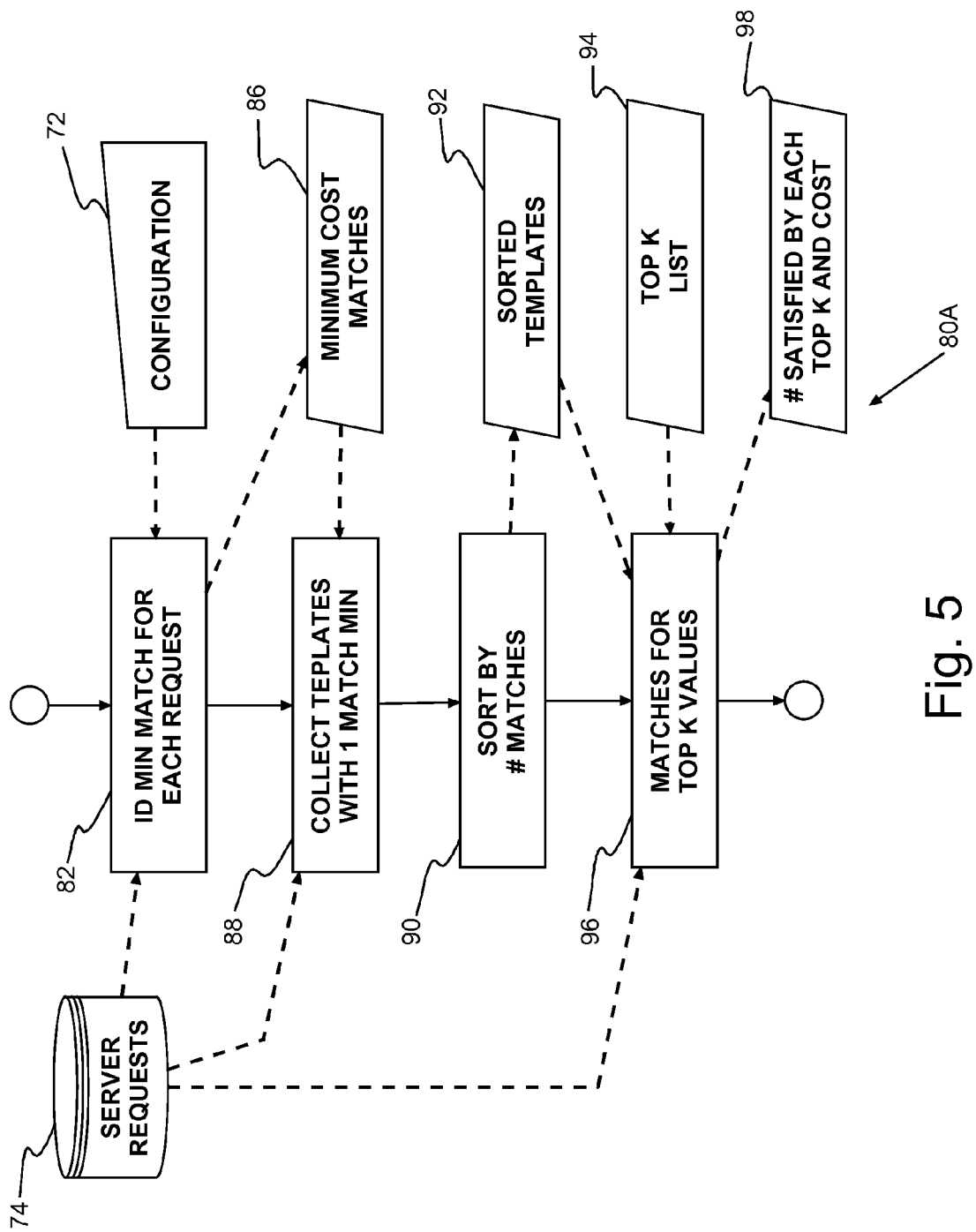
FIG. 5 shows an example of selection of top k templates by a preferred template generator.

FIG. 5 shows an example of selection 80A of top k templates by a preferred template generator 80. First, the configurations 72 are compared against each server requirement in request storage 74 to determine 82 a minimum cost match 86 for each request. Next, any template is discarded 88 that fails to meet the minimum requirements for at least one of the requests in the set. The remaining templates are sorted 90 according to the number of matching requests and the sorted templates are stored 92. The top k lists 94 and the sorted templates 92 are used to determine 96 matching requests for each k. The number of requests satisfied for each k and the costs are passed to output 98, e.g., for display.

So first, the minimum server requirements match for each request is determined 82 by matching, for example, CPU, memory, and disk requirements 74 to the template with the smallest values in the corresponding listed target configurations 72. For a simple example, a CPU capacity target list may allow for selecting 1, 2, 4, 8, 12, 16, ..., $\max_{CPU}$ cores, where $\max_{CPU}$ is the maximum number available. Likewise, both selectable memory and disk space may be, respectively, 1, 2, 4, 8, 12, 16, 32, ..., $\max_{mem}$ gigabyte (GB) and 100, 200, 300, 400, 500, 600, ..., $\max_{disk}$ GB. Although CPU, memory and disk capacity are used for this example, typically, additional resources are considered in a preferred solution, such as, for example, network bandwidth.

The minimum cost match 86 for each server requirement provides a lower bound on the cost for satisfying requirement for each server based on the listed resources, e.g., CPU, memory, and disk. Further, the preferred template generator 80 uses the minimum cost 86 to determine whether all requests can be satisfied at minimum cost. Each match to a minimum cost template is referred herein as the "minimum cost match."

Figure 6A:
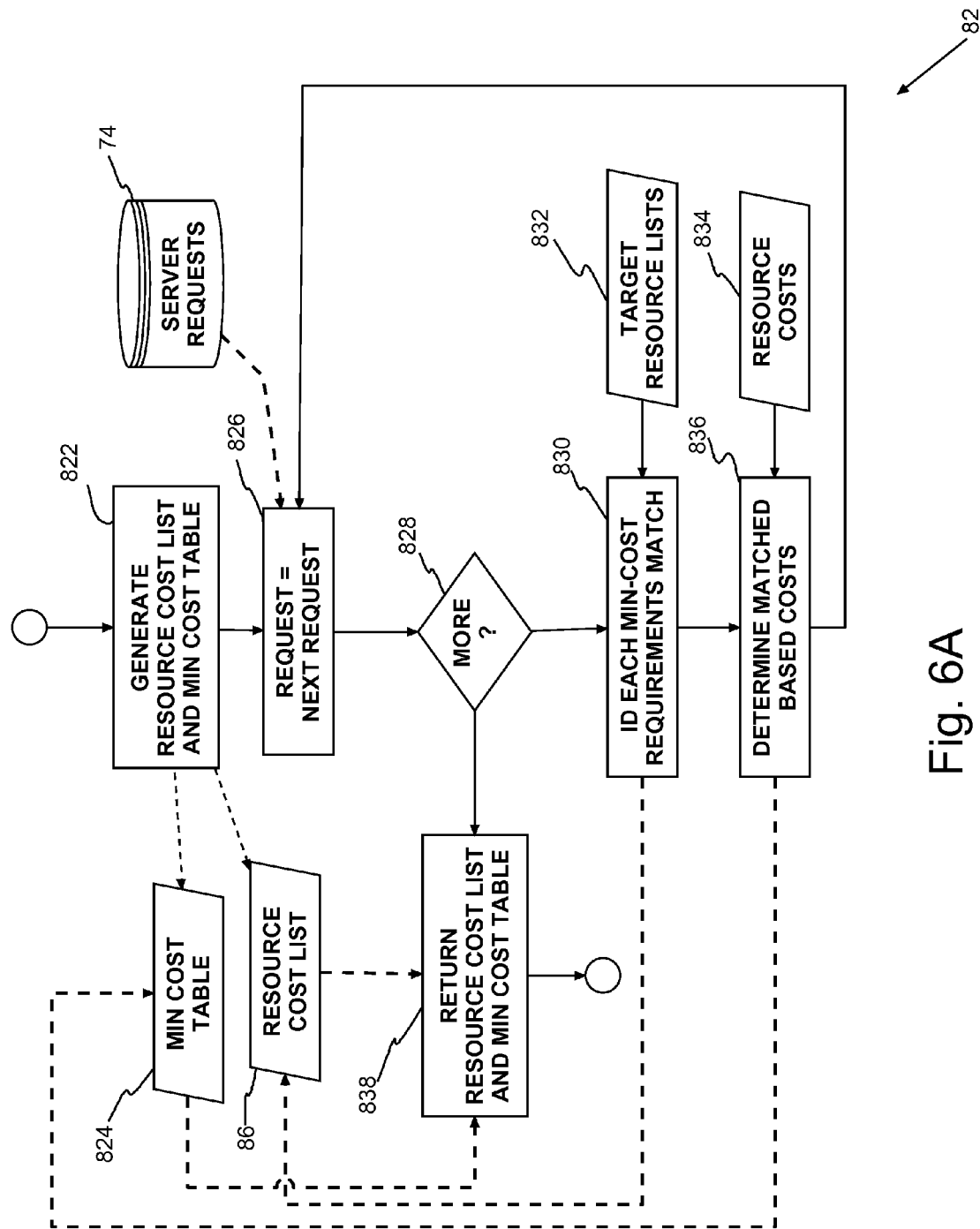
FIG. 6A shows an example of finding minimum cost matches.
Figures 6B, 8:
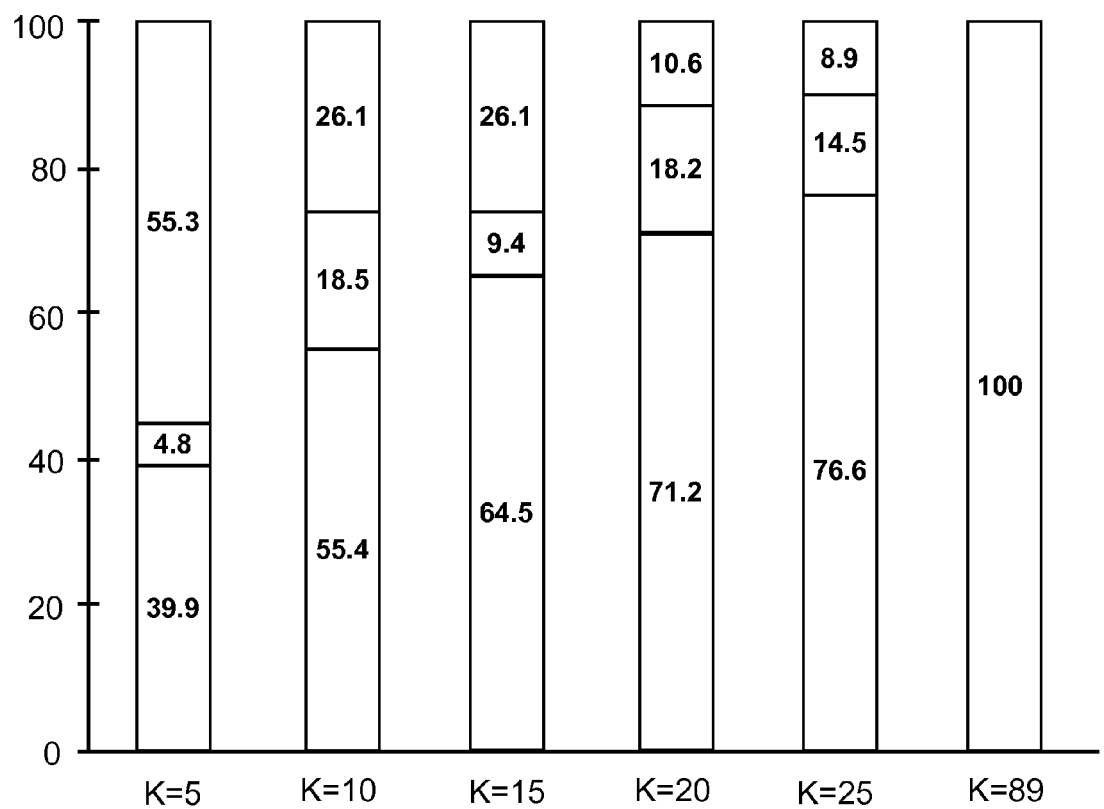
FIG. 6B shows an example of a resource match table created for listing minimum cost matches.
FIG. 8 shows an example of application of the present invention on a set of seven hundred forty seven (747) server requests.

FIG. 6A shows an example of finding minimum cost matches 82 and FIG. 6B shows an example of a resource match table 86 created for listing minimum cost matches according to a preferred embodiment of the present invention. Finding minimum cost matches 82 begins 822 with creating a minimum configuration cost list 824 and the resource match table 86, which in this example, includes a field for the number of cores 860, requested memory 862 and requested disk space 864. Requests 74 are selected 826 in requested order until 828 all requests have been selected. As long as requests remain unselected, the currently selected request is compared 830 against a target resource list 832 to find a template with minimum resources that matches the request requirements. The resource match is entered in the resource match table 86 and using a list of resource costs 834, the cost of the match is determined 836. The cost of the matching template is entered in the minimum configuration cost list 824, and the next request is selected 826. Once all requests have been selected 828, the matched requests 86 and associated costs 824 are returned 838 for subsequent filtering and analysis.

Each template defines an allocable combination of CPU, memory, and disk space. So, after determining the associated costs (824 in FIG. 6A) for each matched request (86 in FIG. 5), unused templates (e.g., duplicates) are discarded 88. As a result, the remaining set of unique templates satisfies at least one request; and, further, every request may be satisfied by at least one template. Also, while some single templates may be used normally to satisfy more than one request, others may be unused, normally, not satisfying any request. However, the set of unique templates, selected from the minimum cost matches 86, include templates to satisfy all the requests 88.

Next, the selected set of templates is sorted 90 according to a selected criterion, e.g., ascending order storage, ascending order memory, by CPU cores, or preferably, by the number of requests satisfied by each template in descending order. So, having collected and sorted a list of templates with at least one match 88 and sorted the list 90, the preferred template generator 80 filters the list of requests to aid in selecting 96 various numbers of most frequent or top requests, which provides n template lists, n lists of top k templates or Top k lists. The preferred template generator 80 uses the Top k lists to identify and list minimum resource matches for each server.

Figure 7:
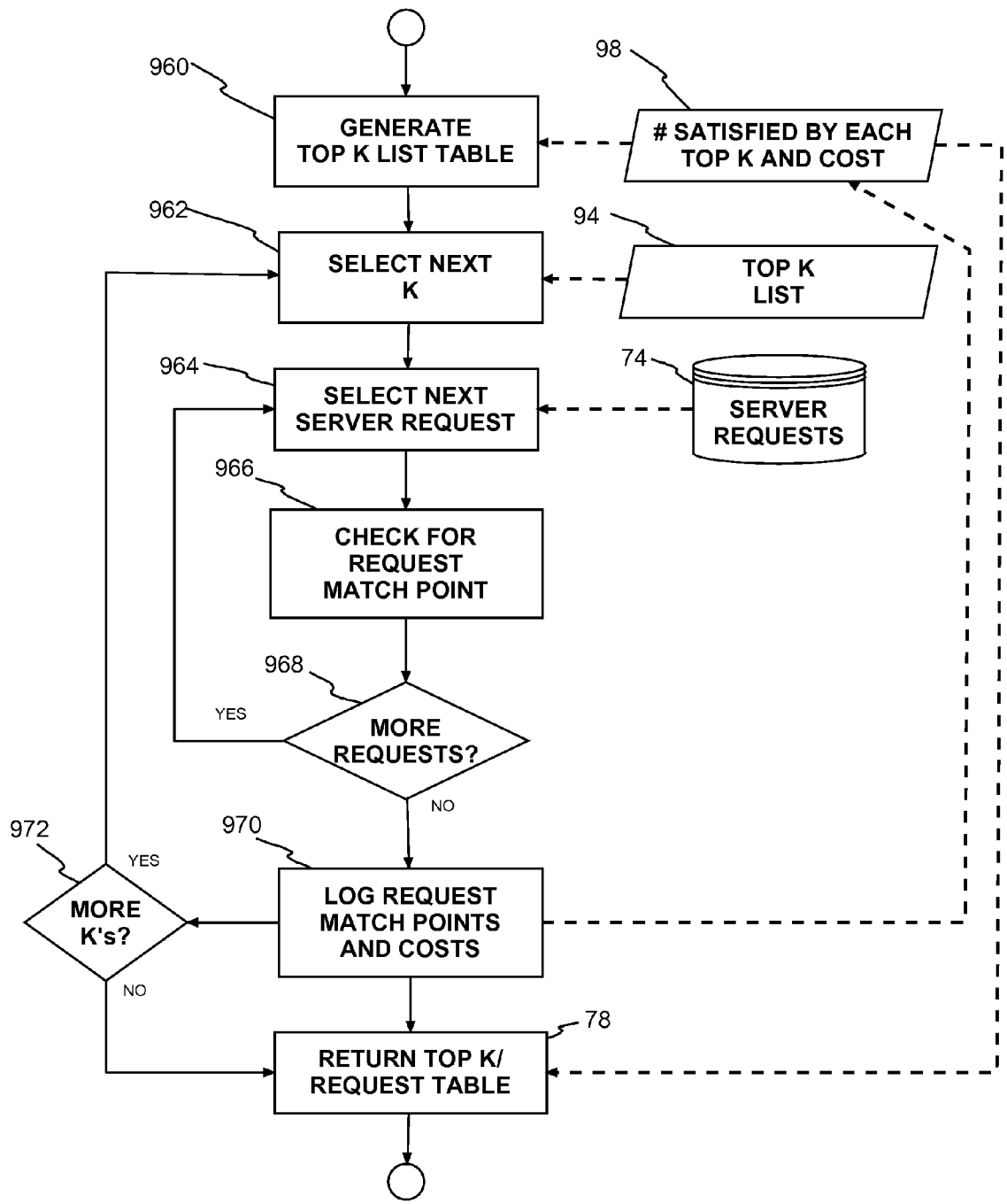
FIG. 7 shows an example generating the final template list by bracketing the Top k lists with a min and a max.

So, as shown in FIG. 7, the preferred template generator (80 in FIG. 4) generates 96 the final template list 78 by bracketing requests for the Top k lists with a min and a max. In particular, the preferred template generator 80 determines the number of requests for each list that cannot be satisfied, or that can be satisfied for minimum cost and for a cost above the minimum cost.

First, the preferred template generator 80 creates 960 a top k request table 98 for the number of requests (e.g., 5, 10, 15, 20, 25) that the top templates satisfy. The first value of k (e.g., 5, 10, 15, 20, 25) is selected 962 from the top k list 94. The first request is retrieved 108 from the request storage 74. Then, the selected request is compared 966 against the templates in the current top k list to determine if any of the templates, whether the minimum (cost) or larger (higher), satisfies the request; or, if the request cannot be satisfied by any of the top k templates. This repeats 968, selecting the next request 964 and comparing 966, until all requests 968 have been compared. Next an entry is made 970 in the top k request table 98 for current value of k indicating the number of requests satisfied and unsatisfied by those templates. If more 972 top k values are listed 94, then returning to 962, the next value is selected and the number of results satisfied and unsatisfied by that top k templates is determined 962-970. Otherwise, when all values of k have been selected 972, the top k request table 98 is returned as the final template list 78. The preferred template generator 80 uses the final template list 78 in trade-off analyses for determining the best top k list, e.g., a point of diminishing returns as indicated by the minimum k list cost.

FIG. 8 shows an example of application of the present invention on a set of seven hundred forty seven (747) server requests for k=5, 10, 15, 20, 25 and 89 (i.e., all templates) with percentage matched at minimum cost (bottom), maximum cost (middle) and unsatisfied (top) by the top k templates.

Accordingly, application of the present invention reduces both over and under provisioning of expensive resource capacity, e.g., processing power, memory, and disk space. Further, because allocable resources may have widely divergent and varying costs individually, the preferred cost-aware clustering technique selects templates based on the collective cost of resources in each template. Thus, by generating and organizing templates according to collective cost, and a number of lowest cost templates are selected that meet server requirements at an optimum cost. Further, the generated template lists facilitates analyzing trade-offs between the number of templates maintained, the number of requests satisfied for each server, and the cost of satisfying those requests.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
a plurality of client devices;
one or more service provider computers selectively making resource capacity available to said plurality of client devices;
a network, resource capacity being provided to said plurality of client devices from said one or more service provider computers over said network; and
a resource provisioning unit generating resource templates for all allocable resource capacity configurations, selecting a subset of generated resource templates, and maintaining a number of resource templates selected from said subset, each template specifying an allocable resource capacity configuration, each requesting client device having resources allocated determined by one of the resource templates of said subset, wherein said resource provisioning unit comprises:
a configuration store storing costs of allocable resources and associated attributes,
a server request store storing previously received requests for capacity,
an input parameter store storing template list options,
a template generator determining a list of resource templates to satisfy said previously received requests at an optimum cost, said list listing said resource templates selected from said subset, and
a template store storing generated template lists, each list having a minimum cost of said template lists for one of said one or more service provider computers.

2. A shared resource system as in claim 1, wherein said template generator generates a template list for each service provider computer, each generated said template list being stored in said template store.

3. A shared resource system as in claim 1, wherein said template list options comprises a complete list option and a top k list option.

4. A shared resource system as in claim 3, wherein said top k list option indicates a plurality of values for k, said template generator generating template lists for all values of k for said each service provider computer, one of the generated said template lists being selected for said each service provider computer and stored in said template store.

5. A shared resource system as in claim 4, wherein each selected template list has a minimum cost of said template lists generated for said each service provider computer.

6. A shared resource system as in claim 1, wherein each said template specifies an allocable configuration comprising a number of cores, memory space and disk space.

7. A method of allocating resources, said method comprising:
- providing a collection of requests for resource capacity from a plurality of computers;
- associating costs with allocable computer resources;
- generating resource templates from said allocable computer resources for all allocable configurations;
- matching each request with one or more template;
- selecting the template having a minimum cost for each request;
- sorting selected minimum cost templates according to the number of matched requests; and
- determining the cost of matching requests for a selected number (k) of most frequently matched templates, the k most frequently matched templates being listed in a top k list.

8. A method of allocating resources as in claim 7, wherein matching said each request comprises:
- generating a list of resource template matches, said list listing each template that matches at least one request;
- associating a cost with said each listed template; and
- determining from all templates with associated costs a matching template for each request with minimum cost.

9. A method of allocating resources as in claim 8, wherein selecting said matching template with minimum cost for said each request comprises:
- finding a template with a minimum resource match for each request, said template being a minimum match template; and
- determining the cost for resources for said minimum match template.

10. A method of allocating resources as in claim 9, wherein determining top k lists comprises:
- listing sorted said matching templates according to the number of requests matching each template;
- determining cost brackets for each a k value; and
- listing said cost brackets in a top k template table.

11. A method of allocating resources as in claim 10, wherein said cost brackets include for each top k list, the number of requests satisfied at minimum cost, above minimum cost and unsatisfied.

12. A method of allocating resources in a cloud environment as in claim 11, wherein templates in the top k list with the lowest associated cost are used for provisioning resources in a cloud environment.

13. A method of allocating cloud environment resources, said method comprising:
- generating resource templates from allocable computer resources for all allocable configurations;
- matching each resource capacity request included in a server request database with one or more template specifying allocable cloud resources;
- collecting matched templates with at least one match, any templates without matches being discarded;
- sorting said matched templates according to the number of matched requests; and
- determining the number of matches for a plurality (k) of matched templates, determined said matches being listed in a top k list;
- generating template lists for all values of k, one of generated said template lists being selected so that the selected template list has minimum cost of said template lists.

14. A method of allocating cloud environment resources as in claim 13, wherein each said template specifies an allocable configuration comprising a number of cores, memory space and disk space and matching said each request comprises:
- generating a resource match table for listing each matching request and template;
- generating a minimum cost list for listing costs associated with each matched template;
- selecting a request from said server request database;
- identifying a template matching the selected said request;
- determining a cost associated with allocable resources specified by the matching said template; and
- adding the matched template and request to resource match table and the associated said cost to said minimum cost list.

15. A method of allocating cloud environment resources as in claim 14, wherein matching said each request comprises:
- determining if unmatched requests remain in said server request database; and until no requests remain unselected
- returning to selecting a next request and determining a matching template and associated costs for said next request.

16. A method of allocating cloud environment resources as in claim 15, wherein determining top k lists comprises:
- sorting said table of said matching templates with the number of requests matching allocable resources for each template;
- selecting a first k value;
- selecting a request from said server request database;
- determining cost brackets for the k value;
- returning to select a next request until all requests have been selected; and when all requests are selected
- listing said cost brackets in a top k template table.

17. A method of allocating cloud environment resources as in claim 16, wherein said cost brackets include for each top k list, the number of requests satisfied at minimum cost, above minimum cost and unsatisfied and templates in the top k list with the lowest associated cost are used for provisioning resources.

18. A computer program product for allocating cloud environment resources, said computer program product comprising a computer usable medium having computer readable program code stored thereon, said computer readable program code causing a computer executing said code to:
- generate resource templates from allocable cloud resources for all allocable configurations;
- generate a resource match table for listing each matching request and template;
- generate a minimum cost list for listing costs associated with each matched template;
- select a request from said server request database;
- identify a template matching the selected said request;
- determine a cost associated with allocable resources specified by the matching said template;
- add the matched template and request to a resource match table and the associated said cost for the first match to said minimum cost list; and until all requests are selected
- return to select a next request and determine a matching template and associated costs for said next request.

19. A computer program product for allocating cloud environment resources as in claim 18, wherein determining top k lists comprises causes said computer executing said code to:
- sort said table of said matching templates with the number of requests matching allocable resources for each template;
- select a k value;
- select a request from said server request database;
- determine cost brackets for said k value;
- return to select a next request until all requests have been selected;

list said cost brackets in a top k template table when all requests are selected; and return to select a next k value until all k values are selected.

20. A computer program product for allocating cloud environment resources as in claim 19, wherein said cost brackets include for each top k list, the number of requests satisfied at minimum cost, above minimum cost and unsatisfied, said computer executing said code using said templates in the top k list with the lowest associated cost for provisioning cloud resources.

21. A computer program product for allocating cloud resources, said computer program product comprising a computer usable medium having computer readable program code stored thereon, said computer readable program code comprising:

computer readable program code means for selectively making service provider computer resource capacity available for allocation to requesting client devices;

computer readable program code means for generating resource templates from allocable resource capacity for all allocable configurations;

computer readable program code means for storing costs and associated attributes of allocable resources;

computer readable program code means for storing previously received requests for capacity; and computer readable program code means for selecting a number of said resource templates and maintaining said selected number of resource templates, each template specifying an allocable resource capacity configuration, each said requesting client device having resources allocated in a cost-aware clustering determined by one of the selected resource templates, wherein said computer readable program code means for selecting and maintaining resource templates comprises:

computer readable program code means for storing costs of allocable resources and associated attributes, computer readable program code means for storing previously received requests for capacity, computer readable program code means for storing template list options, computer readable program code means for determining a list of resource templates to satisfy said previously received requests at an optimum cost, said list listing said resource templates selected from said subset, and computer readable program code means for storing generated template lists, each list having a minimum cost of said template lists for one of said one or more service provider computers.

22. A computer program product for allocating cloud resources as in claim 21, wherein said computer readable program code means for storing template list options includes a complete list option and a top k list option, and said computer readable program code means for determining generates an optimum list of templates to satisfy said previously received requests for each service provider computer.

23. A computer program product for allocating cloud resources as in claim 22, wherein said top k list option indicates a plurality of values for k, said computer readable program code means for generating said optimum list generates template lists for all values of k for said each service provider computer, and selects one of the generated said template lists for said each service provider computer, generated said template lists being stored said top k lists.

24. A computer program product for allocating cloud resources as in claim 22, wherein each said template specifies an allocable configuration comprising a number of cores, memory space and disk space and each selected template list has a minimum cost of said template lists generated for said each service provider computer.

* * * * *